United States Patent [19]
Ichihara et al.

[11] Patent Number: 5,324,946
[45] Date of Patent: Jun. 28, 1994

[54] METHOD AND APPARATUS FOR RECONSTRUCTING SPECT IMAGE WITH MAINTAINING HIGH SPATIAL RESOLUTION

[75] Inventors: Takashi Ichihara; Kyojiro Nambu, both of Tokyo, Japan

[73] Assignee: Kabushiki Kaisha Toshiba, Tokyo, Japan

[21] Appl. No.: 899,693

[22] Filed: Jun. 17, 1992

[30] Foreign Application Priority Data

Jun. 19, 1991 [JP] Japan .................................. 3-147596

[51] Int. Cl.$^5$ ...................... G06F 15/42; G01T 1/166
[52] U.S. Cl. ........................... 250/363.04; 250/363.03; 250/369; 364/413.19; 364/413.21
[58] Field of Search ...................... 250/363.03, 363.04, 250/369; 364/413.21, 413.19

[56] References Cited

U.S. PATENT DOCUMENTS

| | | | |
|---|---|---|---|
| 4,580,219 | 4/1986 | Pelc et al. | 364/413.21 |
| 4,593,355 | 6/1986 | Chase . | |
| 4,729,100 | 3/1988 | Tsujii | 364/413.21 |
| 4,831,261 | 5/1989 | Genna et al. | 250/363.04 X |

FOREIGN PATENT DOCUMENTS 444324  9/1991  European Pat. Off. ........ 250/363.04

OTHER PUBLICATIONS

Keyes, 'Computed Tomography in Nuclear Medicine', Fundamentals of Digital Nuclear Medicine, David Leiberman, Mosby, 1977, pp. 130-138.

IEEE Transactions on Nuclear Science, vol. NS-34, No. 1, pp. 359-363, Feb., 1987, N. Nohara, et al., "Single Photon Emission Computed Tomography with Increased Sampling Density at Central Region of Field-of-View".

Medical Physics, vol. 13, No. 3, pp. 350-353, May-Jun., 1986, R. B. Schwinger, et al., "Area Weighted Convolutional Interpolation for Data Reprojection in Single Photon Emission Computed Tomography".

Physics in Medicine & Biology, vol. 35, No. 10, pp. 1361-1371, Oct., 1990, M. Defrise, et al., "Implementation of Three—Dimensional Image Reconstruction for Multi—Ring Positron Tomographs".

*Primary Examiner*—Constantine Hannaher
*Assistant Examiner*—Edward J. Glick
*Attorney, Agent, or Firm*—Oblon, Spivak, McClelland, Maier & Neustadt

[57] ABSTRACT

In a nuclear medical examination apparatus such as a SPECT (single photon emission computed tomography) image gamma camera, resolution of SPECT images is improved. A nuclear medical examination apparatus includes a detector unit for detecting in a fan-beam form, γ(gamma) rays emitted from a radioisotope injected into a biological body under medical examination to thereby produce γ-ray projection data on the biological body; a scanning unit for relatively rotating both the detector unit and the biological body with respect to a center of rotation so as to obtain γ-ray projection data at predetermined angular directions along the circumference of the biological body; a reconstruction unit for convoluting the projection data obtained from the detecting unit through the scanning unit, and for back-projecting the convoluted projection data only to a specific region of an entire reconstructing region, the above-described specific region being located near the detecting unit, whereby a distribution image of the radioisotope is reconstructed along a sectional plane of the biological body; and a display unit for displaying thereon the distribution image of the radioisotope reconstructed by the reconstructing unit.

14 Claims, 11 Drawing Sheets

METHOD AND APPARATUS FOR RECONSTRUCTING SPECT IMAGE WITH MAINTAINING HIGH SPATIAL RESOLUTION

BACKGROUND OF THE INVENTION

1. Field of the Invention

The present invention generally relates to a method and an apparatus for reconstructing a SPECT (single photon emission computed tomography) image, i.e., a three-dimensional distribution image of a radioisotope which has been injected into a biological body under medical examination, by detecting γ(gamma)-rays emitted from the injected radioisotope. More specifically, the present invention is directed to a SPECT image reconstructing method capable of reconstructing a SPECT image with high spatial resolution by way of the filtered back projection method, and also to such a SPECT image reconstructing apparatus.

2. Description of the Prior Art

SPECT systems include one or more two-dimensional detectors which rotate around a patient and detect radiation emitted from a radioisotope injected into the patient as projection data and perform reconstruction of multiple-slice images of radioisotope distribution in the patient through the convolution and back-projection of the projection data. In such a SPECT imaging system, a fan-beam collimator is used to increase the sensitivity over that of a parallel-hole collimator without sacrificing resolution.

There are several image reconstruction methods known for SPECT images which were originally developed for γ-ray CT scanners. The publication "CONVOLUTION RECONSTRUCTION TECHNIQUES FOR DIVERGENT BEAMS" by G. T. Herman et al., Comput. Biol. Med. Vol. 6; 1976, pages 259–271, describes the technique of fan-beam reconstruction for γ-ray CT scanners. The fan-beam reconstruction method includes convolution and back-projection of projection data without reordering or rearranging projection data detected in fan-beam shape into parallel-beam geometry. The fan-beam reconstruction method has an advantage over the parallel-beam reconstruction method in that projection data detected in fan-beam shape may be rearranged into parallel-beam geometry since no error due to such rearrangement occurs in the fan-beam reconstruction method.

To further to improve a SPECT image resolution, a weighted back-projection method has been attempted. In an article "TRIANGULAR SPECT SYSTEM FOR 3-D TOTAL ORGAN VOLUME IMAGING: DESIGN CONCEPT AND PRELIMINARY IMAGING RESULTS" by C. B. Lim et al., IEEE Transactions on Nuclear Science Vol. NS-32. No.1, February 1985, pages 741-747, a distant-dependent weighting function favoring closer distance to a detector is employed in both parallel-beam and fan-beam reconstructions. However, the article has a negative opinion about such a weighted back-projection as mentioned on page 743, left column, lines 9-4 from the bottom of the second paragraph: "One drawback of the weighted back-projection is the image noise increase due to uneven weighting of the opposing projection image noises within uneven weighting of the opposing projection image noises within SPECT image plane. Therefore in an extremely photon-deficient situation, the weighted back-projection may not be preferable."

SUMMARY OF THE INVENTION

The present invention is directed to a novel SPECT imaging technique, especially a fan beam reconstruction method and system.

One object of the present invention is to provide a method and a system capable of improving a SPECT image resolution.

Another object of the present invention is to provide a precise fan-beam reconstruction algorithm using the weighted back-projection method.

To achieve the above-described objects, a method for reconstructing a SPECT (single photon emission computed tomography) image, according to the present invention, comprises the steps of:

detecting in a fan-beam form by a detecting means (5,6), γ(gamma)-rays emitted from the radioisotope injected into a biological body (P) under medical examination, thereby producing γ-ray projection data on the biological body (P);

acquiring projection data along a predetermined direction around the biological body (P) by relatively rotating the detecting means (5,6) and the biological body (P) with respect to a rotation center;

convoluting the projection data to obtain convoluted projection data; and back-projecting the convoluted projection data only to a specific region of an entire reconstructing region, said specific region being located near the detecting means (5,6), whereby the distribution image of the radioisotope is reconstructed along a sectional plane of the biological body (P).

Furthermore, according to another aspect of the present invention, a nuclear medical examination apparatus (100) comprises:

detector means (5,6,2) for detecting in a fan-beam form, γ(gamma)-rays emitted from a radioisotope injected into a biological body (P) under medical examination, thereby producing γ-ray projection data on the biological body (P);

scanning means (1,2) for relatively rotating both of the detector means (5,6,2) and the biological body (P) with respect to a rotation center so as to obtain γ-ray projection data along a predetermined angle direction around the biological body (P);

reconstruction means (3) for convoluting the projection data obtained from the detecting means (5,6,2) through the scanning means (1,2), and for back-projecting the convoluted projection data only to a specific region of an entire reconstructing region, said specific region being located near the detecting means (5,6,2), whereby a distribution image of the radioisotope is reconstructed along a sectional plane of the biological body (P); and display means (4) for displaying thereon the distribution image of the radioisotope reconstructed by the reconstructing means (3).

BRIEF DESCRIPTION OF THE DRAWINGS

For a better understanding of the present invention, reference is made to the following descriptions in conjunction with the accompanying drawings, in which.

DETAILED DESCRIPTION OF PREFERRED EMBODIMENTS

Overall Arrangement of SPECT Imaging Apparatus

Figure 1:
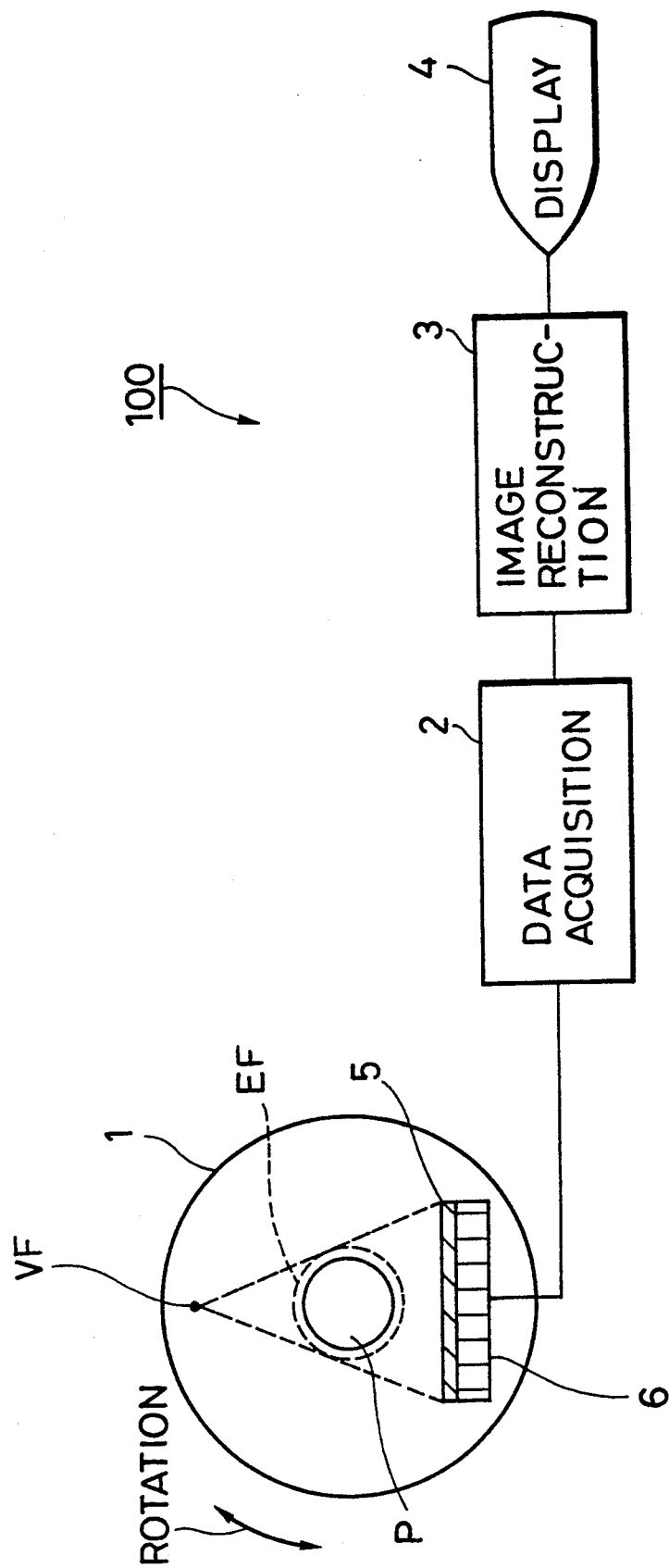
FIG. 1 is a schematic block diagram representing an overall arrangement of a SPECT image reconstructing apparatus according to a preferred embodiment of the present invention.

FIG. 1 is a schematic block diagram representing an overall arrangement of a nuclear medical examination apparatus (simply referred to a "SPECT" imaging apparatus) 100 according to a preferred embodiment of the present invention.

The SPECT imaging apparatus 100 mainly comprises a gantry 1, a data acquisition unit 2, an image reconstruction unit 3, a display unit 4, a fan beam collimator 5, and a gamma camera 6. Since this image reconstruction unit 3 constitutes a major unit of this SPECT imaging apparatus 100, a detailed internal circuit thereof will be described later.

By means of the gantry 1, the gamma camera 6 equipped with the fan beam collimator 5 can be rotated with respect to a biological body "P" under medical examination as a rotating center in order to detect γ(gamma)-rays irradiated from a radioisotope (not shown in detail) injected into the biological body "P" in an omnidirection (360°). Alternatively, more than two gamma cameras may be employed and pivoted around the rotating center by only a predetermined pivot angle (namely, angle of 360°/number of gamma cameras), whereby γ-ray projection data may be similarly acquired at the angle of 360°.

Then, the projection data derived from the single gamma camera 6, rotatably fixed on the gantry 1, is acquired by the data acquisition unit 2. As a consequence, the projection data derived from the gamma camera 6 is first filter-processed in this data acquisition unit 2. Thereafter, the filtered projection data is back-projected under the following condition to reconstruct a SPECT (single photon emission computed tomography) image. That is, a range for the back projection is defined with respect to the respective pixels of the reconstructed image present at a side near the fan beam collimator within an effective visual field of the gamma camera 6. In other words, the convoluted projection data are back-projected only to a limited reconstructing region near the fan beam collimator 5 among the entire reconstructing region, which is a major feature of the present invention.

Back-Projection Range Near Collimator within Effective Visual Field

Figure 2:
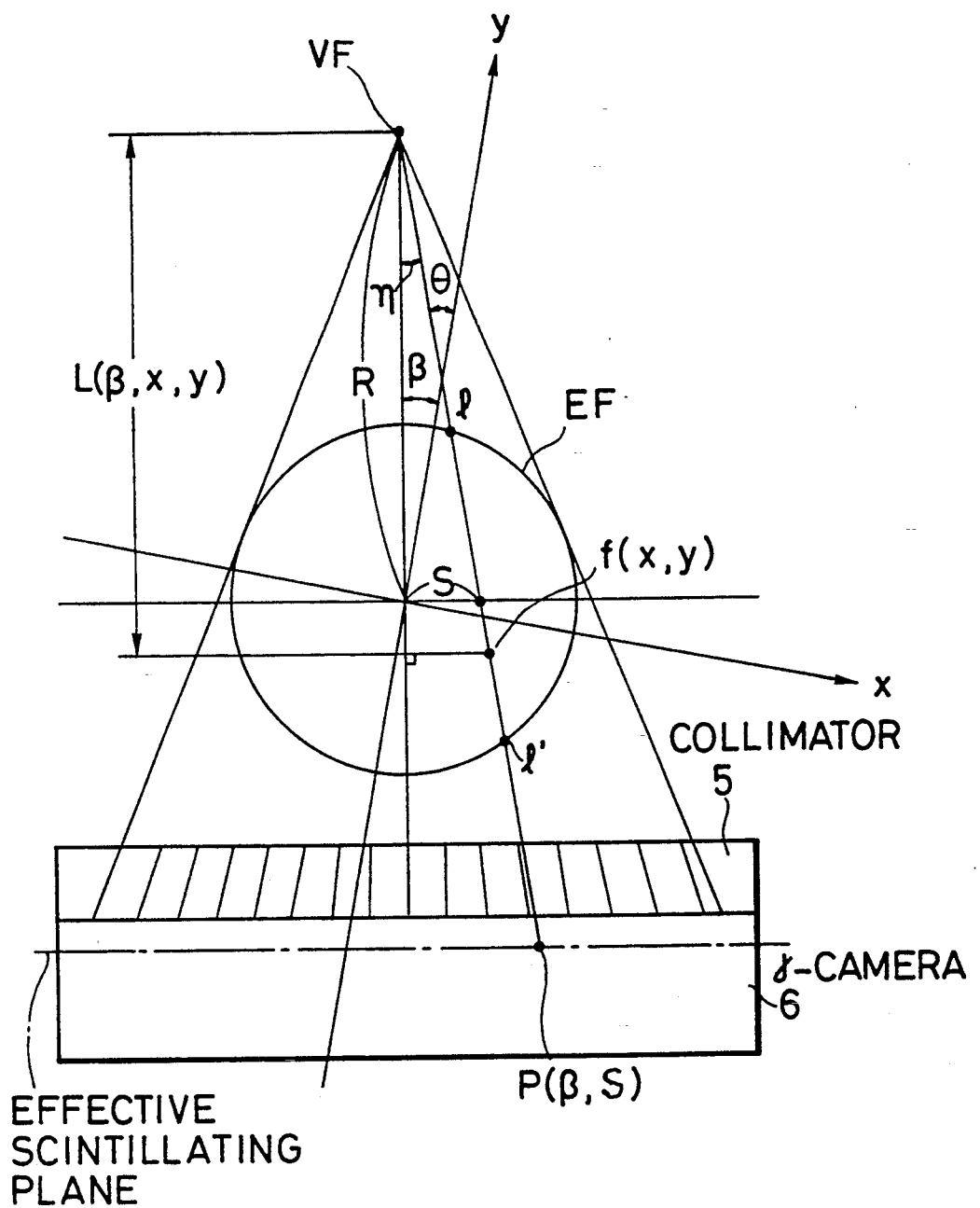
FIG. 2 schematically illustrates a basic reconstruction of a SPECT image employing a fan beam collimator.

In accordance with the present invention, the convoluted projection data must be back-projected only to the limited reconstructing region near the fan beam collimator 5 among the entire reconstructing region within the effective visual field of the gamma camera 6. The reason is as follows:

When a SPECT image is reconstructed employing a fan beam collimator, a geometric positional relationship as shown in FIG. 2 is established among the effective visual field "EF", the fan beam collimator 5, and a focal point "S". In FIG. 2, symbol "$\beta$" denotes an angle of the gamma camera 6 and symbol P($\beta$, S) indicates a point of a projection image along l—l' direction.

When the above-defined geometric positional relationship as shown in FIG. 2 is satisfied, a SPECT value f(x, y) corresponding to the reconstructed image data is expressed by the following equation (1). It should be noted that an integral defined from "$-\pi$" to "$\pi$" shown in this equation (1) corresponds to a back-projection formula.

$$f(x,y) = \frac{1}{2\pi} \int_{-\pi}^{\pi} \left(\frac{R}{L(\beta,x,y)}\right)^2 \int_{-\infty}^{\infty} P(\beta,S)h(t-S)dSd\beta \quad (1)$$

where $$P(\beta,S) = P(\beta,S)\frac{R}{\sqrt{R^2+S^2}} \cdot \frac{R}{\sqrt{R^2+S^2}} = \tan\eta \quad (2)$$

$$\left(\frac{R}{L(\beta,x,y)}\right)^2 = \left(\frac{R}{R-y\cos\beta+x\sin\beta}\right)^2 \quad (3)$$

$$t = R\frac{y\cos\beta+x\sin\beta}{R-y\cos\beta+x\sin\beta} \quad (4)$$

convolution function: $h(r) = -\frac{1}{\pi r^2}$

R, $\eta$, L($\beta$,x,y) are as labelled in FIG. 2.

At this time, the projection data, namely projection image P($\beta$, S) is subjected to the convolution process by a reconstructing filter (not shown in detail), and the projection data from "$-\pi$" to "$\pi$" in a 360°-direction are back-projected along the range of "l" to "l'" within the effective visual field "EF".

In the conventional SPECT imaging method, all of the projection data range within the effective visual field is equally back-projected. That is, when attention is given to a point indicated by "Xc" on the reconstructing image shown in FIG. 3, the projection data are acquired along all directions (360°) passing through this point "Xc". In this case, with respect to an arbitrary straight line 10 passing through this point "Xc", first projection data acquired at a position "A" of a first fan beam collimator 15A which is positioned close to this point "Xc" is actually different from second projection data acquired at a position "B" of a second fan beam collimator 15B which is farther from this point "Xc".

The reason why there is such an actual positional difference in the first and second projection data is as follows.

Figure 3:
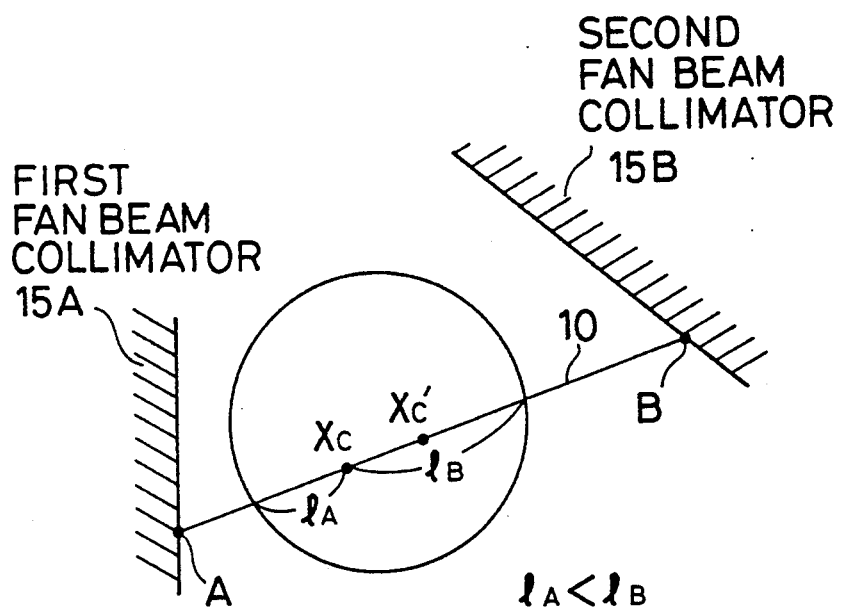
FIG. 3 schematically represents a geometric relationship between points on a reconstructed image and positions of fan beam collimators.
Figure 4:
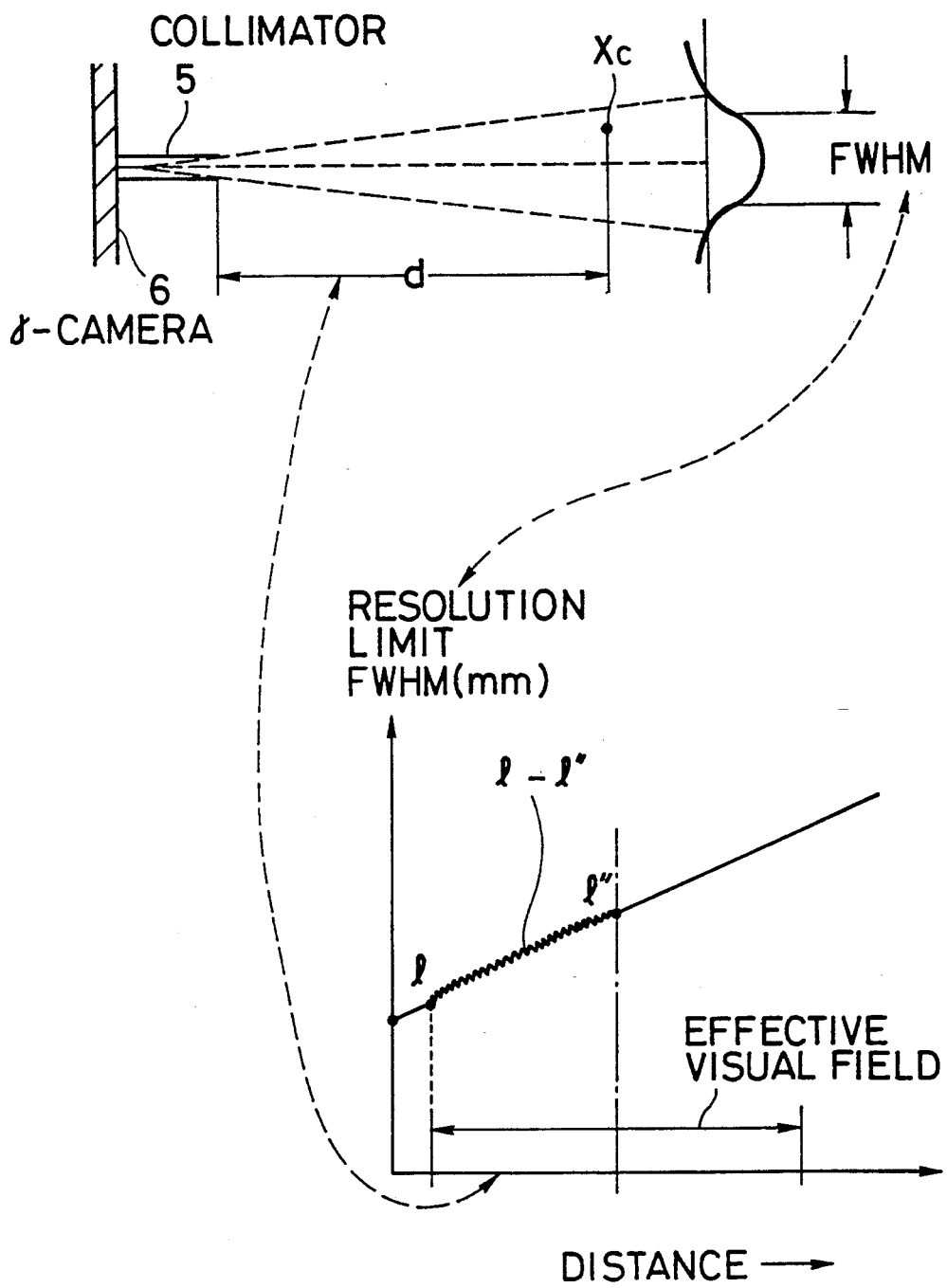
FIG. 4 schematically illustrates correlations between RI densities and projection data at a fan beam collimator.

As a first reason, as schematically represented in FIG. 4, the longer a distance "d" apart from the surface of the fan beam collimator 5 becomes, the lower the RI density at the point "Xc" derived from the gamma camera 6 for detecting gamma rays which have selectively passed through the fan beam collimator 5, becomes. In other words, if such an ideal fan beam collimator that a resolution limit "FWHM" thereof does not depend on the distance "d" but is constant, would be employed in FIG. 3, the first projection data acquired at the position "A" of the first collimator 15A is identical to the second projection data acquired at the position "B" of the second collimator 15B. However, as clearly shown in FIG. 4, the first projection data about the collimator position "A" becomes higher than the second projection data about the collimator position "B" with respect to the densities. This implies that the projection data acquired at the position "A" near the first collimator 15A contains much medical information as compared with the projection data acquired at the position "B" far from the second collimator 15B.

On the other hand, the information about the RI intensity at points around the dotted lines of FIG. 4 cannot be discriminated from the information about the RI intensity at the point "Xc" based on the projection data acquired form the position "B" of the second collimator 15B. This is because the resolution limit "FWHM" becomes wider due to such a longer distance from the position "B" of the second collimator 15B to the point "Xc", as compared with the resolution limit "FWHM" of the first collimator 15A.

A second reason is as follows. As seen from FIG. 3, a first distance from the point "Xc" to the first collimator's position "A" is shorter than a second distance from the point "Xc" to the second collimator's position "B". Accordingly, this implies that when the γ-rays are propagated from this point "Xc" to the first collimator's position "A" absorption of the γ-rays emitted from the point "Xc" by a biological body (not shown in detail) is smaller than absorption of the γ-rays when the γ-rays are propagated from the point "Xc" to the second collimator's position "B" that is one distance "$l_A$" is shorter than the other distance "$l_B$". As a result, the projection data acquired at the position "A" of the first collimator 15A contains more precise counts and less noise than the projection data acquired at the position "B" of the second collimator 15B.

Figure 5:
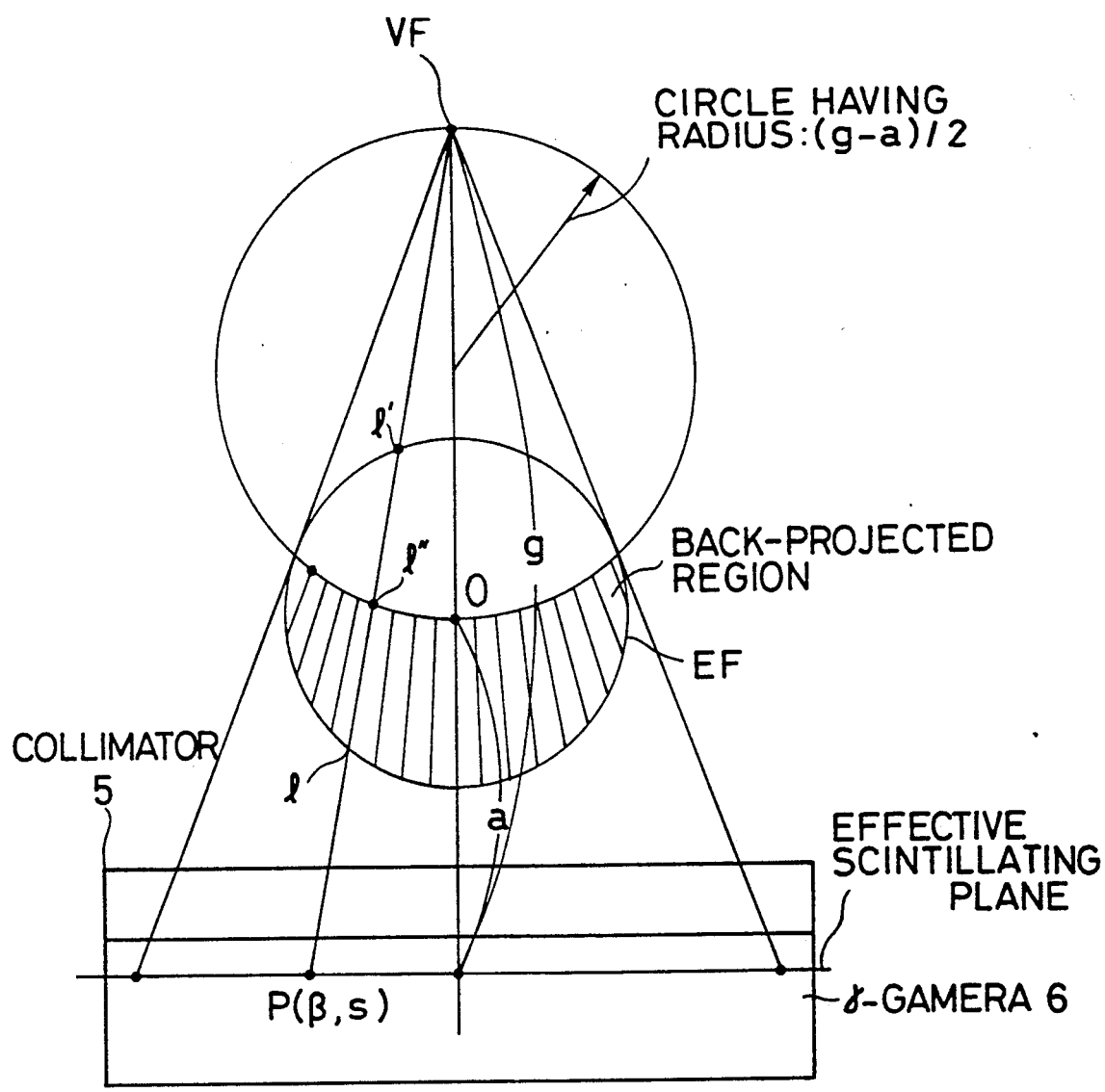
FIG. 5 schematically represents a back-projected region according to the SPECT image reconstructing apparatus 100 shown in FIG. 1.

In accordance with the above-described first and second reasons, a SPECT imaging apparatus according to one preferred embodiment of the present invention is characterized in that the projection data is first convoluted, and then the convoluted projection data is back-projected only to a limited reconstructing region near the fan beam collimator 5 (corresponding to the first collimator 15A) among the entire reconstructing region under such a condition that a point P (β, S) of a projection image (see FIG. 2) is back-projected with an angle "β" of the gamma camera 6 in the above-described equation (1). In other words, as pictorially shown in FIG. 5, a region to be back-projected is limited only to a hatched region which is within the above-described effective visual field "EF" and is positioned near the collimator 5, or which is outside a circle having a radius of (g - a)/2 and is defined by a range "1 to l".

Back-Projected Region

Figure 6:
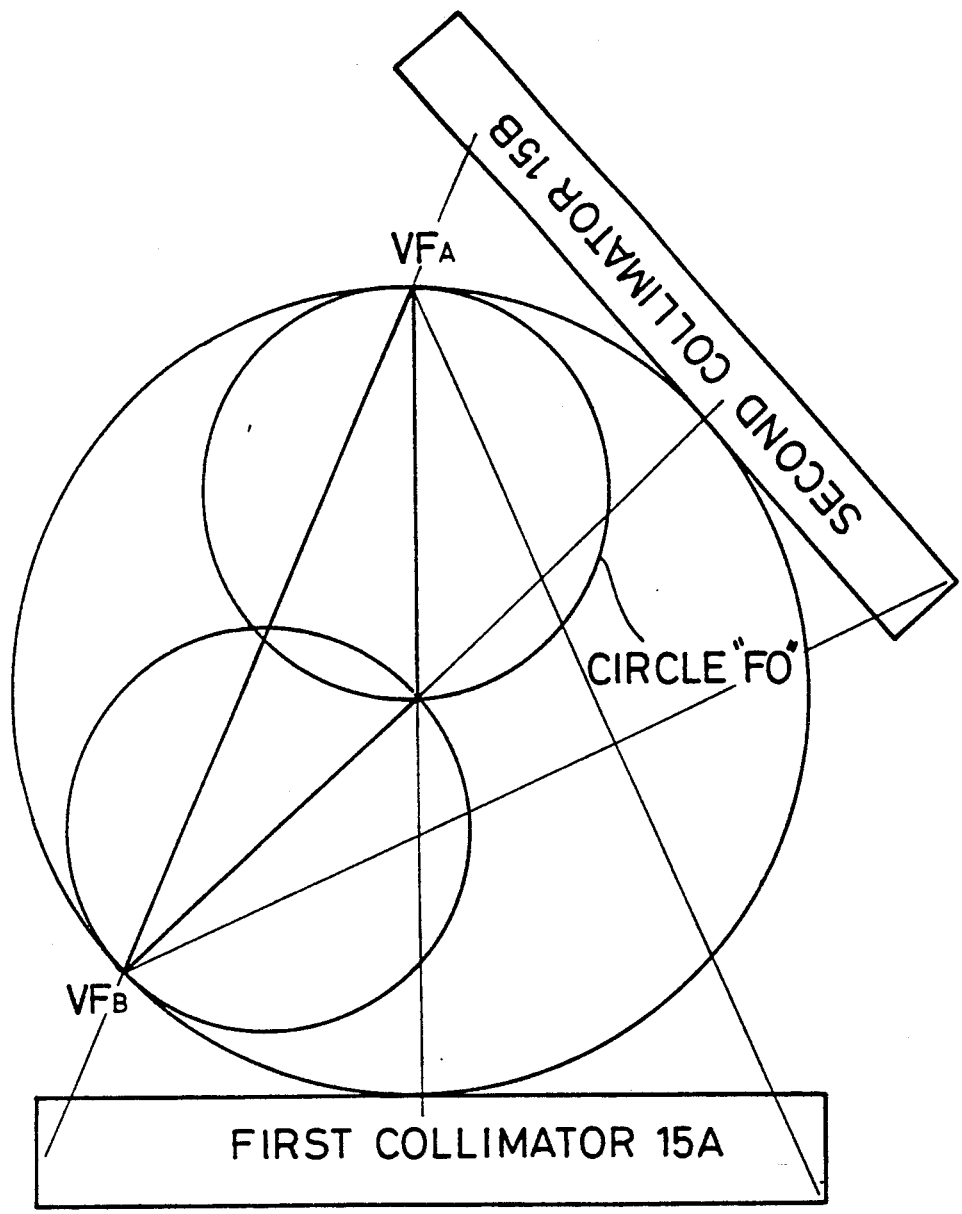
FIG. 6 schematically shows the back-projected region according to the present invention.

Referring now to FIG. 6, a detailed description will be made of such a fact that the region to be back-projected may be defined by a trail of each center point in the respective γ-ray propagation paths from the respective virtual focal points "$VF_A$" and "$VF_B$" of the respective first and second collimators 15A and 15B to the respective γ-ray receiving planes thereof, namely by a trail of equidistant points in the respective γ-ray propagation paths from the respective virtual focal points $VF_A$ and $VF_B$ to the respective γ-ray receiving planes thereof. It should be noted that this back-projection region is limited within the effective visual field of each collimator 15A or 15B. That is, an isosceles triangle is formed between a virtual focal point $VF_A$ or $VF_B$ and a gamma-ray receiving plane of the first collimator 15A or the second collimator 15B. When central points of the respective edges of this isosceles triangle (namely, γ-ray propagation paths) are connected to form a trail, the above-described back-projecting region may be defined within the respective effective visual fields of the first or second collimator 15A or 15B.

Internal Circuit Arrangement of Image Reconstructing Unit

Figure 7:
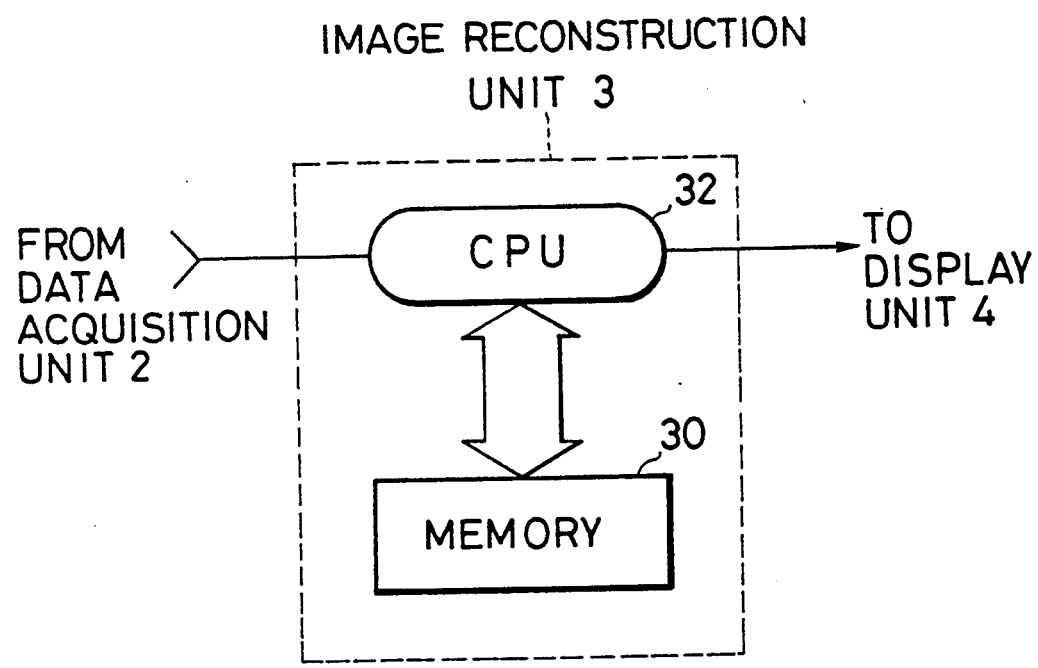
FIG. 7 is a circuit diagram of an internal circuit of the image reconstruction unit employed in the SPECT image reconstructing apparatus.
Figure 8:
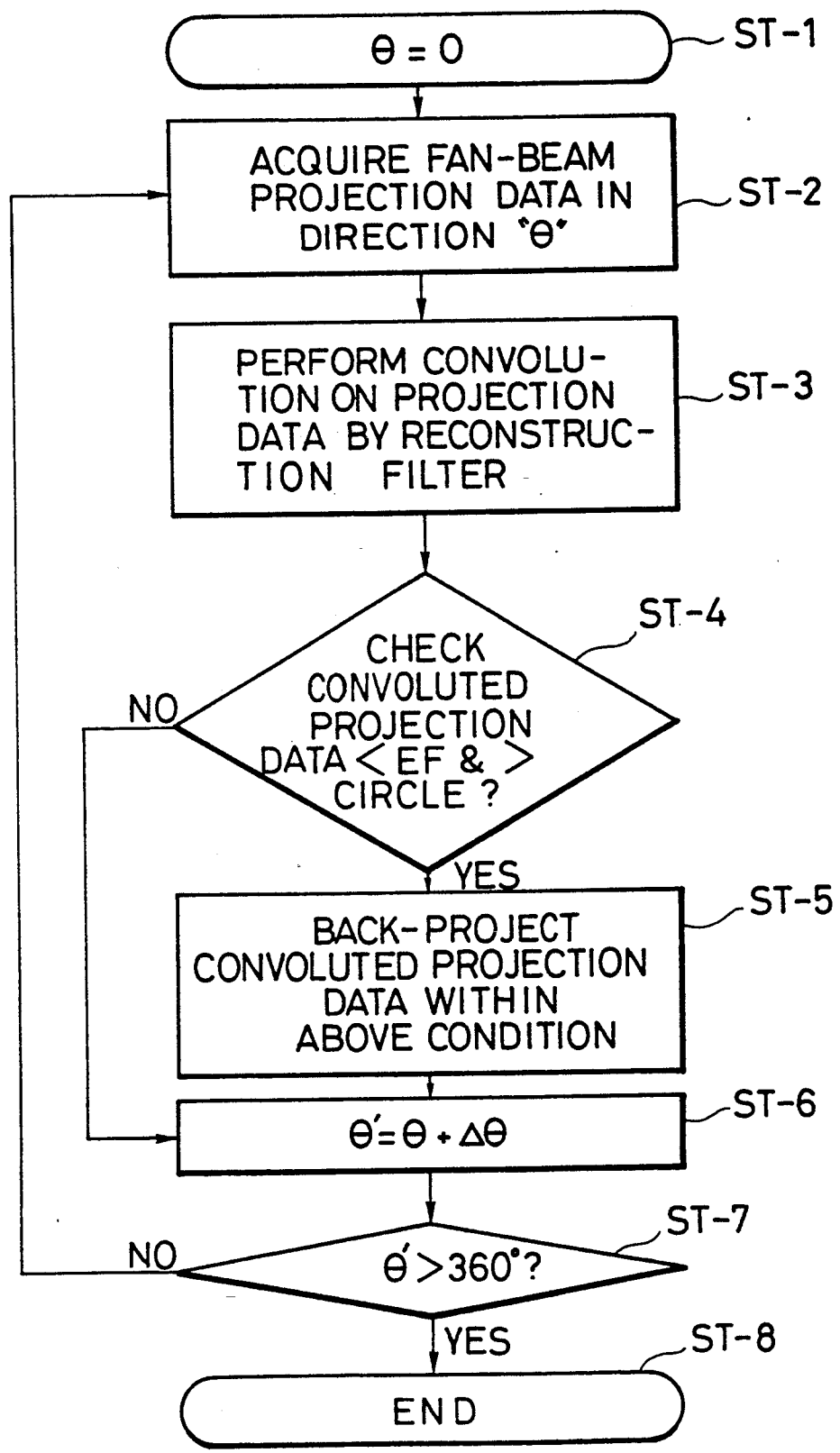
FIG. 8 is a flow chart explaining a SPECT image reconstructing method effected in the SPECT image reconstructing apparatus.

FIG. 7 is an internal circuit arrangement of the image reconstruction unit 3 shown in FIG. 1, which constitutes a major circuit of the SPECT image reconstructing apparatus 100. FIG. 8 is a flow chart explaining an image reconstructing operation effected by the SPECT image reconstructing apparatus 100.

In FIG. 7, the projection data acquired by the data acquisition unit 2 are supplied to a memory unit 30. Then, a central processing unit 32 performs both the image reconstructing operation and the back projecting operation with respect to the projection data and a nuclear medical reconstructing program stored in the memory unit 30.

Precisely speaking, in the flow chart of FIG. 8, both the image reconstructing operation and the back-projecting operation are carried out as follows. At a first step ST-1, an angle "θ" (see FIG. 2) is set to zero. Then, fan beam projection data is acquired along the direction of at a step ST-2. Subsequently, the acquired projection data is convoluted by a reconstruction filter (not shown in detail) under control of CPU 32. At the next step ST-4, a check is made whether or not the convoluted projection data is present within the effective visual field "EF" of the collimator 5 and also outside the circle having a diameter defined by the virtual focal point "VF" and a center of this effective visual field "EF". If YES, then only this convoluted projection data is back-projected at a step ST-5.

To the contrary, if NO at the step ST-4, then the process is advanced to a further step ST-6. At this step ST-6, a small angle "Δθ" is added to the first-mentioned angle "θ". Thereafter, another cheek is made whether or not the added angle "θ" at the previous step ST-7 is greater than 360° at a further step ST-7. If YES, then a series of the above-described reconstruction and back-projection operations are accomplished at a step ST-8. Conversely, if NO, since a series of these reconstruction and back-projection operations are not yet completed, the process is returned to the previous step ST-2. Accordingly, the above-explained reconstruction and back-projection operations will now be continued from this step ST-2 until this angle θ' becomes greater than 360°.

Weighting Process for Boundary Projection Data

On the other hand, in case that another point "Xc'" is located at a substantially middistance from the position "A" of the first collimator 15A and the position "B" of the second collimator 15B as shown in FIG. 3, even if one projection data is acquired by, for instance, the first collimator 15A which is located closer to this point Xc' than the second collimator 15B, the spatial resolution of the resultant SPECT image obtained through the first collimator 15A is not always better than that obtained through the second collimator 15B. Alternatively, since both the projection data acquired through both of the first and second collimators 15A and 15B contain substantially equal projection information, there is another merit that the noises contained in both of these projection data may be averaged or reduced if both of these projection data are processed in the SPECT image reconstructing apparatus 100. That is, when both of these projection data are employed, the noises appearing in the projection data at the point Xc' may be reduced by approximately $\frac{1}{2}$.

Figure 9:
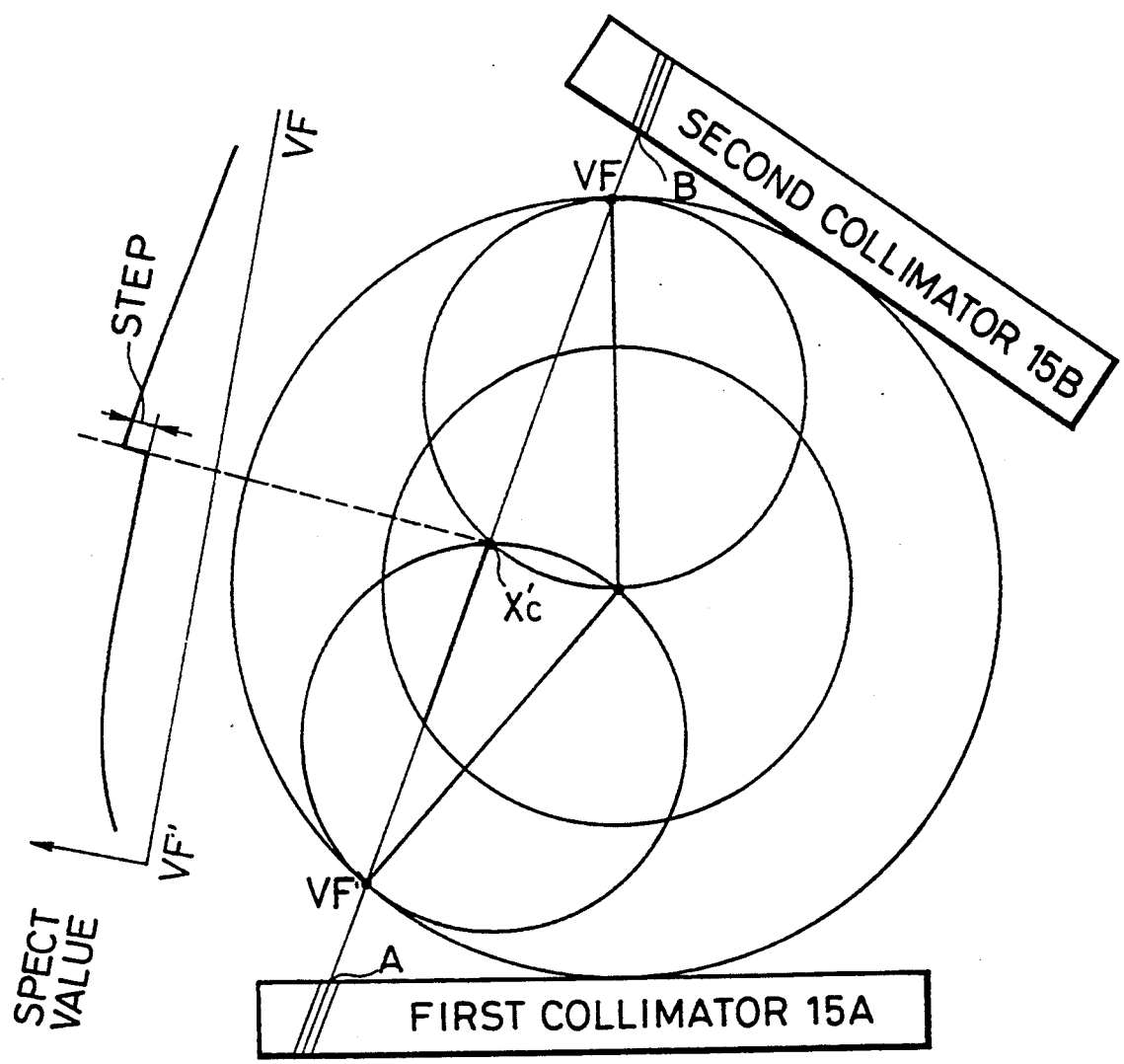
FIG. 9 schematically represents discontinuities appearing in the projection data in the SPECT image reconstructing apparatus.

To the contrary, if such a discontinued connection is performed that the projection data at the point Xc' is acquired through only the first collimator 15A whereas the projection data at a position near this point Xc' is acquired through only the second collimator 15B, a so-called "step" (see FIG. 9) happens to occur at the boundary portion. As is known in the art, such a step may cause "artifact" in the resultant SPECT image. Accordingly, such a discontinued connection as shown in FIG. 9 is not employed in the SPECT image reconstructing apparatus 100.

A description will now be made of the above-described gradual connection, namely the method for utilizing both of the image data acquired at the central point Xc' by a half amount thereof with reference to FIGS. 10 and 11.

Figure 10:
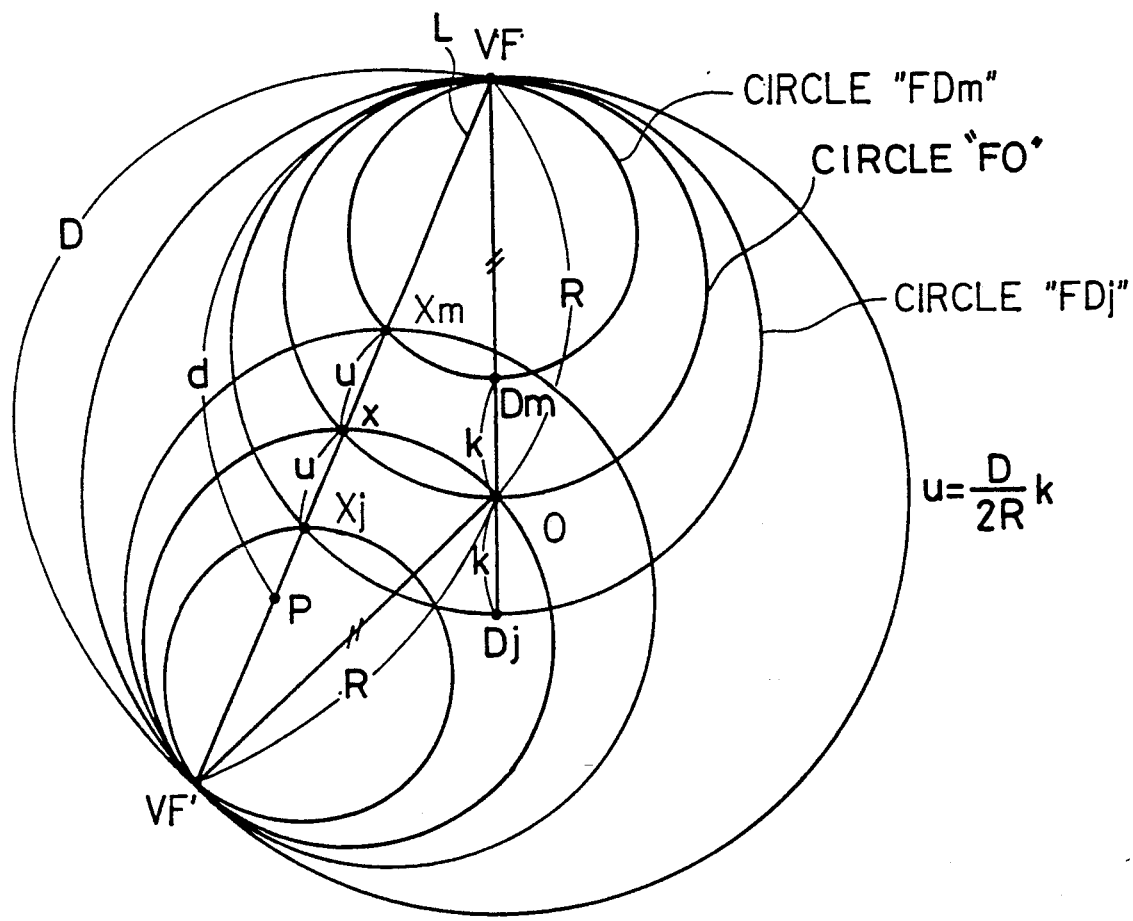
FIG. 10 schematically shows a method for interpolating the discontinuities of FIG. 9.

As shown in FIG. 10, it is assumed that a reduced circle "FDm" has a diameter of FDm, and an enlarged circle "FDj" has diameter of FDj. It should be noted:

$$|ODm| = |ODj| = k$$

It is also assumed that points of these circles intersecting with a beam "L" of the virtual focal point VF, are X, Xm and Xj, respectively.

Figure 11:
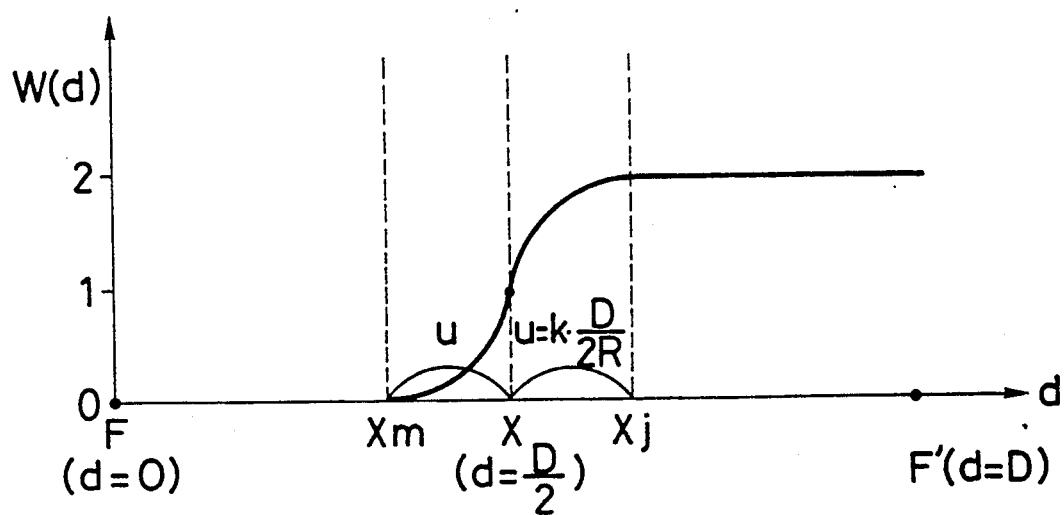
FIG. 11 graphically represents a concrete example of interpolating the discontinuities of FIG. 9.

Next, weighting "W" is performed with respect to this beam, or line "L" as shown in FIG. 11. It should be noted that this weighting process is completely different from the weighting process for the fan-beam back projection (i.e., reverse square of a distance from the virtual focal point VF), and corresponds to such a calculation in that a weight of the fan-beam back projection is further multiplied with "W". It should be noted that "W" should be smoothly connected from 0 to I with regard to Xm to Xj. Moreover, the following equation (2) must be satisfied:

$$W(d) + W(FF - d) = 2 \qquad (2)$$

To satisfy this equation (2), the following formulae may be utilized with respect to d=Xm to Xj:

$$W(d) = 0;\ d < D/2 - U \qquad (3)$$

$$W(d) = 1;\ d < D/2 + u \qquad (4)$$

$$W(d) = (1 - \frac{(d - D/2)^3}{2u^3} + \frac{3(d - D/2)}{2u}; \qquad (7)$$

$$D/2 - u \leqq d \leqq D/2 + u$$

That is, the above-described conditions (3) to (5) should be satisfied.

As a consequence, the discontinuity at the point Xc' of FIG. 9 can be avoided, whereby not only the above-described artifact can be eliminated from the resultant SPECT image, but also the noises can be removed from the center portion of the SPECT image.

In accordance with the above-described SPECT imaging apparatus 100 shown in FIG. 1, resolution of the resultant SPECT image was improved up to 4.8 mm.

As previously described in detail, in accordance with the SPECT image reconstructing apparatus and method of the present invention, since the SPECT image is reconstructed under such a condition that the back-projection range is limited to the region near the fan beam collimator within the effective visual field of the collimator or gamma camera, resolution of the resultant SPECT image can be considerably improved, as compared with that of the conventional SPECT image.

What is claimed as new and is desired to be secured by Letters Patent of the United States is:

1. A method for reconstructing a distribution image of a radioisotope in a nuclear medical examination system, said method comprising the steps of:

detecting in a fan-beam form, by a detector means having a fan-beam collimator, gamma rays emitted from a radioisotope injected into a biological body under medical examination so as to obtain gamma ray projection data for the biological body;

acquiring projection data in fan-beam form at predetermined angular directions along a circumference of said biological body by relatively rotating said detector means and said biological body with respect to a center of rotation, said predetermined angular directions being measured with respect to said center of rotation;

convoluting said projection data at each of said predetermined angular directions to obtain convoluted projection data; and back-projecting said convoluted projection data for each of said predetermined angular directions into a specific region within a reconstructing region, wherein said specific region corresponds to a region excluding an area encompassed by a first circle which passes through a focal point of said fan-beam collimator and which has a diameter equal to the distance between said focal point of said fan-beam collimator and said center of rotation.

2. A reconstructing method as claimed in claim 1, wherein said projection data acquired in fan-beam form is convoluted without being rearranged into a combination of parallel gamma ray beams.

3. A reconstructing method as claimed in claim 1, wherein said specific region within which said convoluted projection data is back-projected is defined by a region within a second circle of which said center of rotation is a center and which is inscribed completely within said fan-beam form of said gamma rays emitted from said radioisotope, wherein said first circle is larger than said second circle, and wherein said specific region is not encompassed by both of said first circle and said second circle.

4. A reconstructing method as claimed in claim 1, wherein said predetermined angular directions along a circumference of said biological body are in the range of 0° to 360°.

5. A reconstructing method as claimed in claim 1, wherein said reconstructing region corresponds to a region which lies within a circle of which said center of rotation is a center and which is inscribed completely within said fan-beam form of said gamma rays emitted from said radioisotope.

6. A single photon emission computed tomography (SPECT) apparatus comprising:
   detector means having a fan-beam collimator for detecting in a fan-beam form, gamma rays emitted from a radioisotope injected into a biological body under medical examination, thereby obtaining gamma ray projection data for said biological body;
   means for effecting relative rotation between said biological body and said detector means about a center of rotation to thereby acquire projection data in fan-beam form at predetermined angular directions along a circumference of said biological body, said predetermined angular directions being measured with respect to said center of rotation;
   reconstructing means for convoluting said projection data obtained from said detector means to obtain convoluted projection data at each of said predetermined angular directions, and for back-projecting said convoluted projection data into a specific region of a reconstructing region, wherein said specific region corresponds to a region excluding an area encompassed by a first circle passing through a focal point of said fan-beam collimator and having a diameter equal to the distance between said focal point of said fan-beam collimator and said center of rotation, whereby a distribution image of said radioisotope is reconstructed along a sectional plane of said biological body; and
   display means for displaying thereon said distribution image.

7. A SPECT apparatus as claimed in claim 6, wherein said reconstructing means convolutes said projection data acquired in fan-beam form without rearranging said projection data into a combination of parallel gamma ray beams.

8. A SPECT apparatus as claimed in claim 6, wherein said detector means includes:

a fan-beam collimator having a virtual focal point positioned such that said gamma rays emitted from said radioisotope appear to emanate therefrom;
at least one scintillation camera for converting said gamma rays into photons and outputting photon signals; and
a projection data acquisition unit for processing said photon signals to obtain said gamma ray projection data for said biological body.

9. A SPECT apparatus as claimed in claim 8, wherein said virtual focal point of said fan-beam collimator and a gamma ray receiving plane of said fan-beam collimator together substantially form an isosceles triangle, said gamma rays being propagated along the directions of the equidistant sides of said isosceles triangle.

10. A SPECT apparatus as claimed in claim 6, wherein said means for effecting relative rotation between said biological body and said detector means includes a gentry on which said detector means is mounted, said gantry being relatively rotatable around said biological body with respect to said center of rotation.

11. A SPECT apparatus as claimed in claim 6, wherein said predetermined angular directions along a circumference of said biological body are in the range of 0° to 360°.

12. A SPECT apparatus as claimed in claim 6, wherein said reconstructing means includes:
   a memory device for storing a nuclear medical image reconstructing program; and
   a central processing unit for executing image reconstruction of said distribution image by processing said gamma ray projection data in accordance with said nuclear medical image reconstructing program.

13. A SPECT apparatus as claimed in claim 6, wherein said specific region within which said convoluted projection data is back-projected is defined by a region within a second circle of which said center of rotation is a center and which is inscribed completely within said fan-beam form of said gamma rays emitted from said radioisotope, wherein said first circle is larger than said second circle, and wherein said specific region is not encompassed by both of said first circle and said second circle.

14. The apparatus as claimed in claim 6, wherein said reconstructing region corresponds to a region which lies within a circle of which said center of rotation is a center and which is inscribed completely within said fan-beam form of said gamma rays emitted from said radioisotope.

* * * * *